2,968,651
Patented Jan. 17, 1961

2,968,651
PROCESS FOR PREPARING NORMALLY CRYSTALLINE VINYLIDENE CHLORIDE POLYMERS

Louis C. Friedrich, Jr., James W. Peters, and Marion R. Rector, Midland, Mich., assignors to The Dow Chemical Company, Midland, Mich., a corporation of Delaware No Drawing. Filed Feb. 8, 1957, Ser. No. 638,917

2 Claims. (Cl. 260—87.7)

This invention relates to a new process for preparing normally crystalline vinylidene chloride polymers. More particularly it relates to such a process for preparing those polymers in controlled particle size.

For purposes of this application the term, normally crystalline vinylidene chloride polymers, will be meant to include the polymers of vinylidene chloride and the copolymers of vinylidene chloride with another monoethylenically unsaturated monomer, such as vinyl chloride, vinyl acetate, and acrylonitrile, and wherein the vinylidene chloride is present in predominant amount and preferably constitutes at least 70 percent of the weight of the monomeric material from which the copolymer is prepared. The normally crystalline vinylidene chloride polymers have long been recognized as valuable materials for preparing films, foils, fibers, filaments and molded articles. Processes for preparing such polymers in aqueous emulsion or in non-emulsified aqueous suspension have been known for a long time. For several reasons the suspension techniques are preferred. Emulsion polymerization gives particles which frequently are so finely divided and of such low bulk density as to be inconvenient for use in molding or extrusion. Further, the emulsions require an extra coagulation step which is both costly and time consuming. In the suspension processes a water-soluble or water-dispersible granulating agent is used to cause the polymer to be in the form of spheres which are small enough to be easily handled yet large enough to be free flowing. When no granulating agent is used, the polymerizing particles agglomerate or coalesce into large, hard lumps of polymer which must be ground before use. It has been found that the optimum particle sizes for use in hopper-fed fabricating devices are those which will pass a 20 mesh screen and rest on a 140 mesh screen.

When it is desired to use those copolymers in the preparation of thin transparent films, other considerations are involved. Any ingredient used in the polymerization recipe must either be compatible with the polymer or must be capable of being washed away from the polymer or the resulting film will be hazy and possibly could have significantly reduced physical properties.

A still further consideration is the bulk density, or weight per unit of volume, of the polymer. Polymers having a low bulk density are expensive to ship and to store and present fabrication problems. However, as the bulk density increases it is generally true that the ability of the polymer to be formulated with plasticizers and the like is made more difficult.

It would be desirable to have a granular, free-flowing, normally crystalline vinylidene chloride polymer having a high bulk density, and capable of fabrication into film having good clarity. It is the principal object of this invention to provide a process for preparing such a polymer.

It is a further object to provide such a process which is adaptable to be used in conventional polymerizing equipment.

It has now been found that an improved polymer may be prepared when specific small amounts of methyl hydroxypropyl cellulose are added to the water phase of a suspension polymerization system consisting of water, an oil-soluble polymerization catalyst, and monomeric vinylidene chloride or monomeric vinylidene chloride and up to about 30 percent of a comonomer such as vinyl chloride, and the composition is subjected to polymerization conditions while agitated.

The amounts of the ingredients other than the cellulose ether that may be used are the same as are normally used in suspension polymerization processes. Thus the amount of water employed may be in an amount of from about 1 to about 4 parts by weight per part of monomer. When substantially less than 1 part is used, there is insufficient water to dissipate effectively and economically the heat of polymerization. When the system contains substantially more than about 4 parts, the process becomes unattractive economically.

The catalysts used are oil-soluble peroxides such as benzoyl and lauroyl peroxides or other free radical catalysts soluble in the monomer. Such catalysts are usually employed in amounts of from 0.1 to 1.0 percent by weight of the monomers. Within this range the amount of catalyst used has no noticeable effect on granulation or other characteristics of the system.

This process is carried out at the normal temperatures of polymerization of vinylidene chloride. These temperatures usually fall in the range of from 35° C. to 75° C.

The methyl hydroxy propyl cellulose should be employed in an amount of from 0.01 to 0.06 percent by weight based on the weight of the monomers. When no cellulose ether is used, the resulting polymer is in the form of large irregularly shaped lumps and extremely fine powder. When more than 0.06 percent of cellulose ether is used and the resulting polymer fabricated into transparent film, the film is found to be quite hazy.

It has been found that the medium viscosity grades of methyl hydroxypropyl cellulose are to be preferred. The term viscosity grade as herein used means the viscosity of a 2 percent aqueous solution of the methyl hydroxypropyl cellulose measured at 20° C. By medium viscosity grades are meant those having a viscosity of from about 100 to 1500 centipoises. The lower viscosity grades are useful in the process but slightly more than the expressed concentration may be required. The very high viscosity grades are more difficult to dissolve.

As is true with the prior suspension polymerization procedures, this process requires agitation to form the initial dispersion, to assist in heat transfer, and to prevent settling of the polymer particles. Agitation is a function of and dependent upon the particular design of the reactor. The amount of agitation should be adequate to assure proper heat transfer. Each investigator will be able to determine the optimum agitation for his particular reaction vessel. It has been found that the process of this invention is especially advantageous when large reaction vessels are employed. In such vessels it is difficult to obtain an agitation pattern which is uniform throughout the vessel. In the past, when such vessels were used, it was deemed necessary to use large amounts of a granulating agent to obtain a proper size distribution. However, large amounts of granulator cause an excessive amount of finely divided polymer to be produced and the resultant polymer cannot be used for transparent film fabrication because of haziness in the film.

The advantages and operation of this process will be more apparent from the following illustrative example wherein all parts and percentages are by weight.

Into an upright cylindrical polymerization vessel having a capacity of 3500 gallons and equipped with a co-axial agitator and jacketed for heating and cooling was charged 100 parts of a monomeric material consisting of 85 percent vinylidene chloride and 15 percent vinyl chloride, 200 parts of water, 0.3 part of lauroyl peroxide, and 0.05 part of water soluble methyl hydroxypropyl cellulose (400 cps. viscosity grade). Polymerization was initiated and maintained by heating the dispersion to 60° C. while running the agitator at 45 r.p.m. After polymerization was complete, the polymer was isolated by filtration, dried, and the particle size distribution determined. It was found that the majority of the particles passed through a 30 mesh screen and were retained on a 100 mesh screen (U.S. standard sieve sizes). The polymer was formulated with 7 percent diisobutyl adipate and thermally extruded into transparent film showing no haziness and having adequate cling tendencies.

In a similar manner when the process was repeated using 0.014 part of methyl hydroxypropyl cellulose, the particle size distribution, lack of haziness, and cling properties in the film were improved over the above.

By way of contrast, when the process was repeated using 0.067 part of methyl hydroxypropyl cellulose the resulting film was hazy and had reduced cling properties.

We claim:
1. A process for polymerizing a monomeric material consisting of from 70 to 100 percent by weght of vinylidene chloride and from 30 to 0 percent by weight of a comonomer in which (1) said monormeric material is placed in a closed vessel together with from 0.1 to 1.0 percent by weight of a free radical polymerization catalyst soluble in the monomer and (2) said monomeric material and catalyst is dispersed in from 1 to 4 parts by weight based on the weight of said monomeric material of an aqueous phase containing from 0.01 to 0.06 percent by weight of a water soluble methyl hydroxypropyl cellulose of a viscosity grade of from 100 to 1500 centipoises, all percentages being based on the weight of said monomeric material, and (3) the dispersion of the polymerizing particles is maintained with agitation at a temperature of from 35 to 75° C. until polymerization is complete.

2. The process claimed in claim 1 wherein said monomeric material consists of from 70 to 100 percent by weight of vinylidene chloride and correspondingly from 30 to 0 percent by weight of vinyl chloride.

References Cited in the file of this patent
UNITED STATES PATENTS

| | | |
|---|---|---|
| 2,494,517 | Naps | Jan. 10, 1950 |
| 2,538,051 | Schick | Jan. 16, 1951 |